United States Patent
Cervi

(10) Patent No.: US 12,168,581 B2
(45) Date of Patent: Dec. 17, 2024

(54) APPARATUS FOR STACKING LAYERS OF CONTAINERS

(71) Applicant: CLEVERTECH S.p.A., Cadelbosco di Sopra (IT)

(72) Inventor: Simone Cervi, Sant'Ilario d'Enza (IT)

(73) Assignee: CLEVERTECH S.p.A., Cadelbosco di Sopra (IT)

( * ) Notice: Subject to any disclaimer, the term of this patent is extended or adjusted under 35 U.S.C. 154(b) by 0 days.

(21) Appl. No.: 18/331,706

(22) Filed: Jun. 8, 2023

(65) Prior Publication Data
US 2024/0025675 A1    Jan. 25, 2024

(30) Foreign Application Priority Data
Jul. 22, 2022    (IT) .................. 102022000015504

(51) Int. Cl.
*B65G 61/00*    (2006.01)
*B65G 57/04*    (2006.01)
*B65G 59/04*    (2006.01)

(52) U.S. Cl.
CPC ............. *B65G 61/00* (2013.01); *B65G 57/04* (2013.01); *B65G 59/04* (2013.01); *B65G 2201/0235* (2013.01)

(58) Field of Classification Search
CPC ............. B25J 15/0616; B25J 15/0052; B25J 15/0691; B65G 61/00; B65G 57/04; B65G 59/04; B65G 2201/0235; C03B 35/145; C03B 40/005
USPC ................. 414/797, 799, 796.2, 752.1, 793; 294/188
See application file for complete search history.

(56) References Cited

U.S. PATENT DOCUMENTS

| | | | |
|---|---|---|---|
| 3,387,718 A | | 6/1968 | Roth et al. |
| 4,389,064 A | * | 6/1983 | Laverriere .............. B66C 1/025 428/136 |
| 5,259,859 A | * | 11/1993 | Claassen .............. C03B 40/005 65/289 |
| 5,813,713 A | * | 9/1998 | Van Den Bergh .... B66C 1/0281 414/752.1 |
| 6,579,053 B1 | * | 6/2003 | Grams .................. B65G 47/90 414/268 |
| 6,802,688 B1 | * | 10/2004 | Andersen .............. B65G 47/91 414/797 |

(Continued)

FOREIGN PATENT DOCUMENTS

| | | |
|---|---|---|
| CN | 114634030 A | 6/2022 |
| DE | 1926479 A1 | 12/1970 |

(Continued)

OTHER PUBLICATIONS

Search Report received in connection with Italian Application No. 102022000015504, dated Feb. 27, 2023.

*Primary Examiner* — Gregory W Adams
(74) *Attorney, Agent, or Firm* — Maschoff Brennan

(57) ABSTRACT

An apparatus for moving containers may include a stacking system for forming several overlapping layers of containers and a feeding line for feeding the containers to the stacking system. The stacking system may include a first pick-up head for picking up a group of the containers from the feeding line to form one of the layers. The first pick-up head may include one or more suction nozzles for sucking the group of containers and lateral compression sides which laterally retain the group of containers.

6 Claims, 5 Drawing Sheets

(56) References Cited

U.S. PATENT DOCUMENTS

| | | | |
|---|---|---|---|
| 7,017,961 B1 * | 3/2006 | Parnell | B65G 47/91 |
| | | | 294/2 |
| 7,887,108 B1 * | 2/2011 | Cawley | B25J 15/022 |
| | | | 414/731 |
| 7,950,708 B2 * | 5/2011 | Parnell | B25J 15/0616 |
| | | | 294/2 |
| 8,960,749 B2 * | 2/2015 | Fukano | H01L 21/6838 |
| | | | 294/188 |
| 9,457,479 B2 * | 10/2016 | Usami | B25J 15/0028 |
| 9,576,832 B2 * | 2/2017 | Tomida | H01L 21/67733 |
| 10,384,886 B2 * | 8/2019 | Gerhardt | B65B 25/06 |
| 10,583,568 B2 * | 3/2020 | Tanahashi | B25J 15/06 |
| 2010/0040450 A1 | 2/2010 | Parnell | |
| 2010/0316479 A1 * | 12/2010 | Perl | B07C 5/36 |
| | | | 414/800 |
| 2019/0077615 A1 * | 3/2019 | Tommesani | B65G 59/04 |
| 2021/0032050 A1 * | 2/2021 | Hayes | B65G 47/90 |

FOREIGN PATENT DOCUMENTS

| | | | | |
|---|---|---|---|---|
| FR | 2524441 A3 | 10/1983 | | |
| GB | 2062577 A | 5/1981 | | |
| JP | S63171731 A | 4/1988 | | |
| JP | 2005306481 A * | 11/2005 | | A23L 3/001 |
| WO | 0064790 A1 | 11/2000 | | |

* cited by examiner

APPARATUS FOR STACKING LAYERS OF CONTAINERS

CROSS REFERENCE TO RELATED APPLICATIONS

The current application claims priority to Italian Patent Application No. 102022000015504 filed on Jul. 22, 2022, the entirety of which is incorporated by reference herein.

FIELD

The present invention relates to an apparatus and a method for moving containers.

BACKGROUND

Systems for moving containers, such as boxes of food products which are conveyed close to one another along an advancement line are used. The systems may include a stacking system which allows to position a stack of several layers of said boxes on a support.

For example, the stacking system includes a pusher which pushes groups of boxes in succession on a support which is located slightly lower. Thereby, the various layers stacked on top of each other are formed. Furthermore, a separator sheet is placed between one layer and the other.

A drawback of such a solution is related to the fact that the boxes tend to stack up against the pusher element. Consequently, there is a stack on the support which could be uneven with a higher concentration of boxes in the rear part of the support and a lower concentration in the front part. This complicates the subsequent de-stacking.

SUMMARY

An apparatus for moving containers may include a stacking system for forming several overlapping layers of containers and a feeding line for feeding the containers to the stacking system. The stacking system may include a first pick-up head for picking up a group of the containers from the feeding line to form one of the layers. The first pick-up head may include one or more suction nozzles for sucking the group of containers and lateral compression sides which laterally retain the group of containers.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
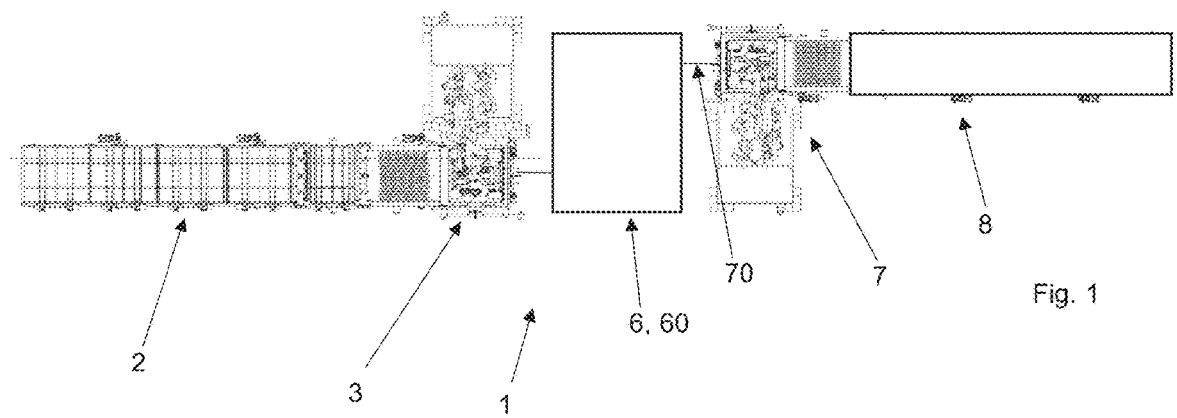
FIG. 1 shows a general view of the apparatus for moving containers according to some embodiments.
Figure 2:
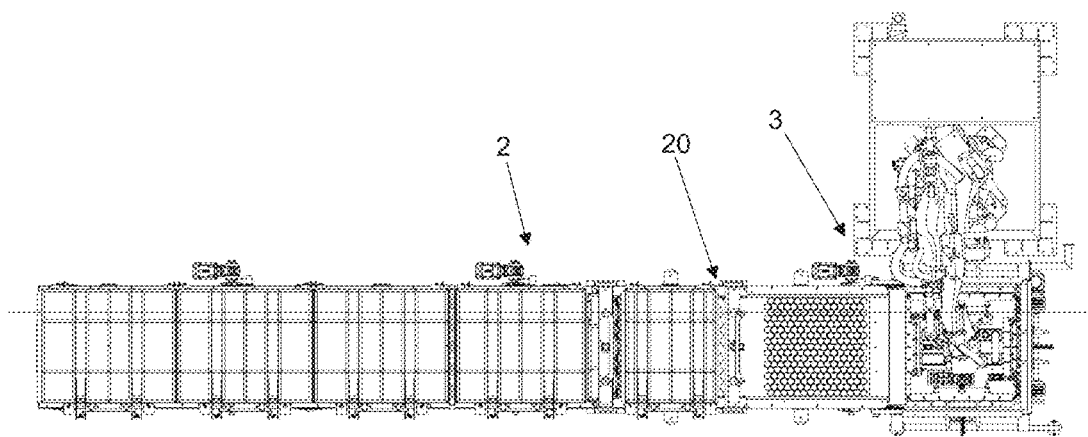
FIGS. 2 to 5 show, from different points of view, a portion of the apparatus of FIG. 1.
Figure 3:
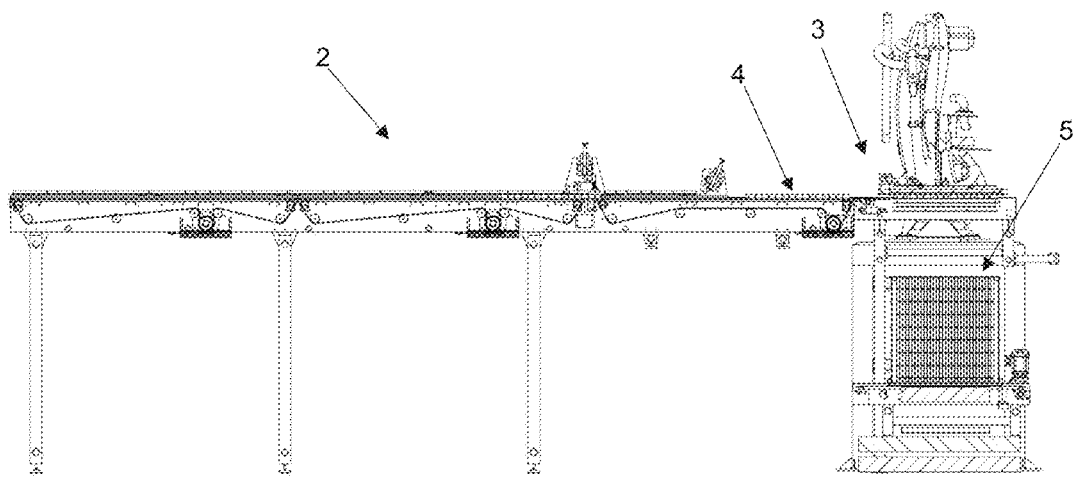
Figure 4:
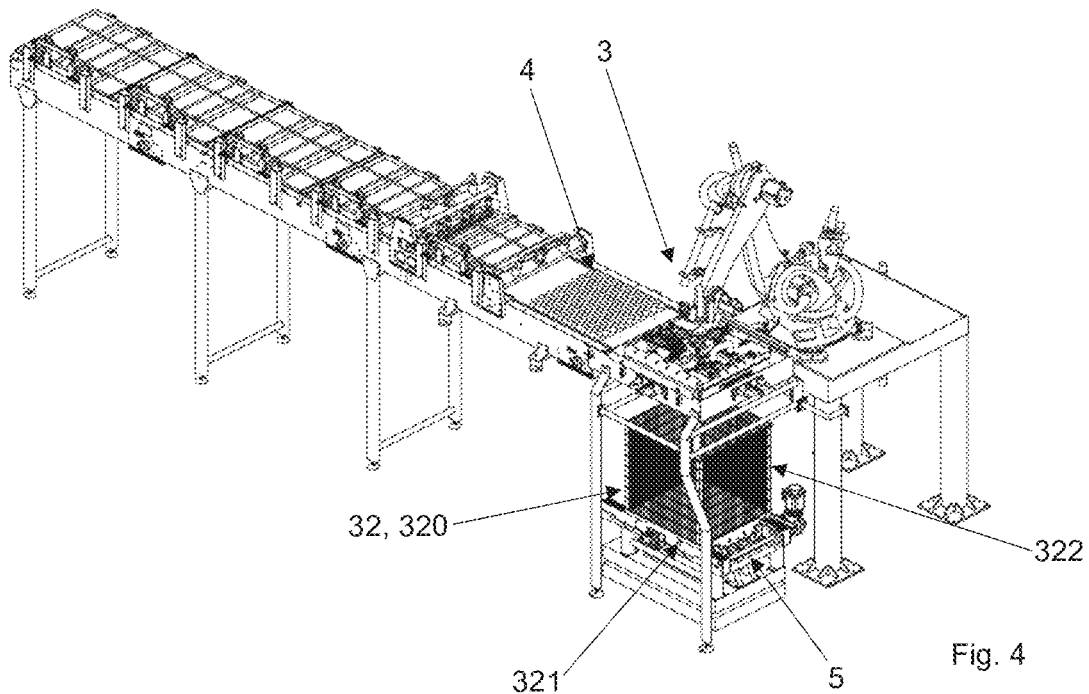
Figure 5:
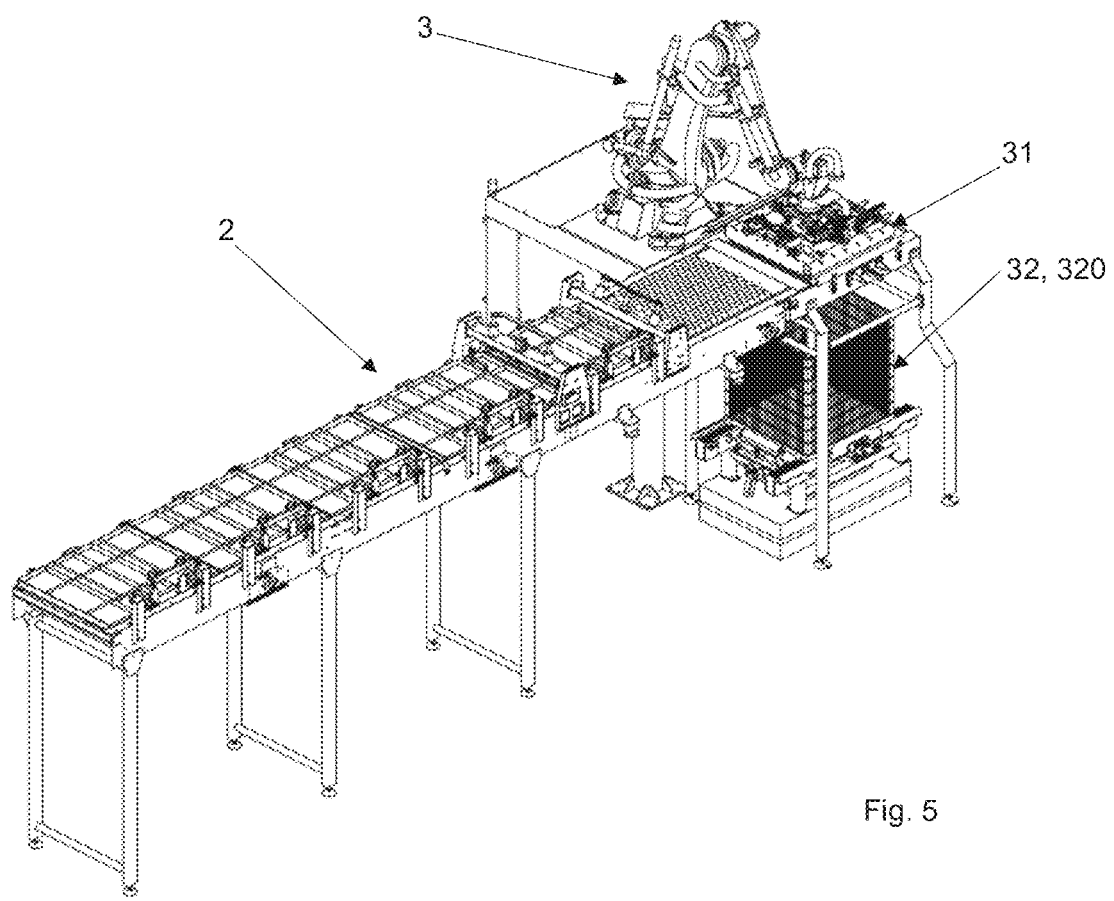

Systems for moving containers, such as boxes of food products which are conveyed close to one another along an advancement line may include a stacking system which allows to position a stack of several layers of said boxes on a support. This typically occurs via a robot having an arm provided with an end head. The head has suction nozzles which pick up in bulk a group of boxes which are then transferred on a support.

A drawback of such a solution is related to the fact that in the presence of drops of water or dirt deposited on the boxes, the vacuum induced by the suction may not be able to retain some containers (which could therefore fall during the movement by the head).

Some embodiments of the current disclosure propose an apparatus and a method for moving containers which may allow to optimize or improve the movement of containers, which may help to minimize the risk of the drawbacks described above.

The defined technical task and the specified aims may be substantially achieved by an apparatus and a method for moving containers. For example, one or more of the defined technical task and the specified aims may be achieved following the technical features set forth in one or more of the appended claims.

Further features and advantages of the present invention will become more apparent from the following indicative and therefore non-limiting description of an apparatus and a method for moving containers as illustrated in the drawings. In the drawings, reference number 1 denotes an apparatus for moving containers.

Such an apparatus 1 comprises a stacking system 3 for forming several overlapping layers of containers. Such a stacking system is sometimes also known as a palletising system.

The apparatus 1 also comprises a feeding line 2 for feeding said containers to said stacking system 3. Such a feeding line 2 suitably comprises for example a conveyor belt or a system of trays or other type of movable supports.

Suitably along the feeding line 2 there is a movable barrier system which allows to isolate a group of containers intended to be picked up by the stacking system 3. Suitably, the feeding line 2 allows an advancement of such a group of containers. For example, this could occur by means of a conveyor belt placed downstream of the barrier system.

The stacking system 3 comprising a first pick-up head 31 for picking up a group of said containers intended to form one of said layers from said feeding line 2. Advantageously, the first head 31 is placed at one end of an articulated arm (for example a robot with at least 6 axes). In an alternative solution, the first head 31 is located on a Cartesian system which moves it along at least two orthogonal axes (such as horizontal).

The first head 31 then allows to stack a plurality of layers of containers on top of each other. A separator sheet can be present between one layer and the other.

The first head 31 in turn comprises one or more suction nozzles 310 of said group of containers. Such suction nozzles 310 can comprise multiple holes obtained on a plate or defined by a grid. Or such suction nozzles 310 can be defined by passages defined by a material which allows the passage of air and therefore allows a suction action to be exerted. In some embodiments, such suction nozzles 310 are evenly distributed along a plate.

Suitably, the first head 31 defines a housing area 316 of the group of containers. Suitably such a housing area 316 faces downwards.

Suitably the first head 31 comprises lateral compression sides 311 which laterally retain said group of containers. Suitably, such lateral sides 311 surround the housing area 316 of the group of containers. A gap or a slit or a separator passage can be present between two adjacent sides 311. Suitably such sides 311 comprise a vertical wall 318 and a lower edge 319 bent towards the inside of the housing area 316. The lower edge is suitably horizontal. Suitably, such sides 311 define a C-shaped cross-section.

Suitably, one or more of said lateral sides 311 comprises at least two opposite sides 312, 313. The two opposite sides 312, 313 advantageously exert a pushing action towards the inside of the area 316; in particular they exert a pushing action along the same direction and the opposite direction. For example, the two opposite sides 312, 313 exert a pushing action orthogonal to a movement direction of the containers along an end section of the feeding line 2.

The apparatus 1 advantageously comprises a gripping station 4 and an unloading station 5 for gripping and unloading said group of containers by means of the first pick-up head 31.

The lateral sides 311 of the first head comprise an additional side 314 which in at least a first operating configuration of the first head 31 is arranged rearwards with respect to a direction which extends from the gripping station 4 towards the unloading station 5. The first operating configuration is suitably defined as a configuration assumed by the first head 31 during the movement from the gripping station 4 to the loading station 5 with said group of containers on board.

Suitably, the housing area 316 is quadrilateral. Suitably, the lateral sides 311 extend on at least three sides or four of said quadrilateral area 316. Suitably, only one side of the housing area 316 corresponds to one side, but there could also be two or more.

Suitably, at least two sides 311 (in particular the two opposite sides 312, 313) are movable by tilting between an engagement position of the containers and a disengagement position (in particular they are rotatable around a corresponding rotation axis). Eventually there could even be only one tiltable side. Suitably at least one side is translatable back and forth between an engagement position of the containers and a disengagement position.

In some embodiments, the apparatus 1 comprises a system 60 for treating containers. For example, the treatment system 60 comprises a station 6 for sterilising containers which is placed downstream of said stacking system 3.

Figure 6:
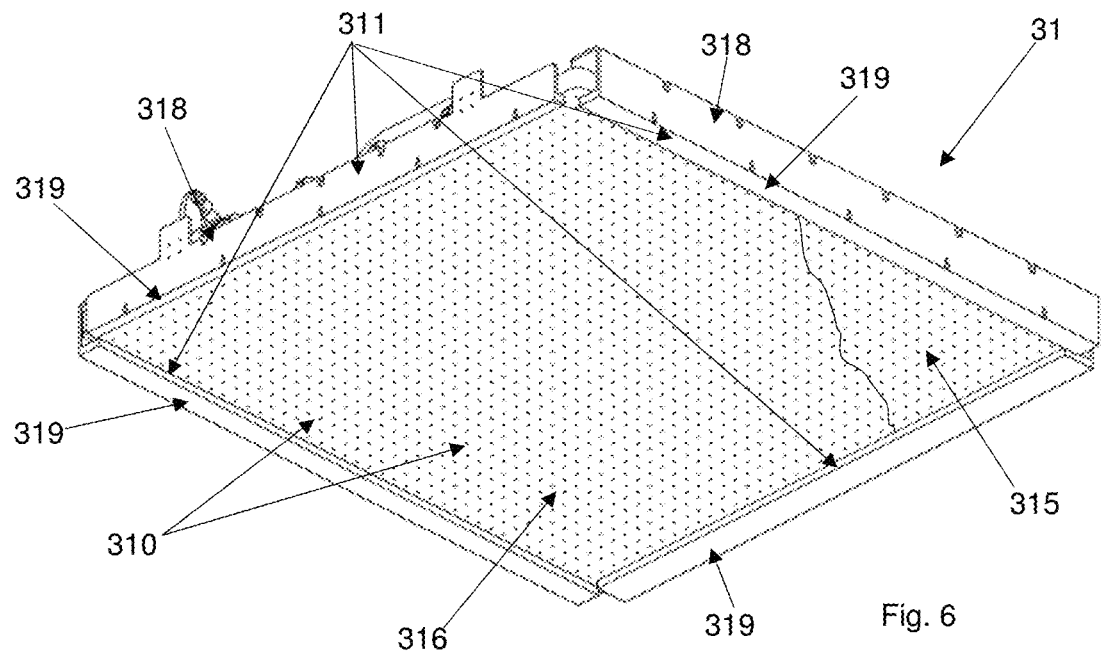
FIGS. 6 to 8 show, from different points of view, a detail of the solution shown in FIGS. 2 to 5.
Figure 7:
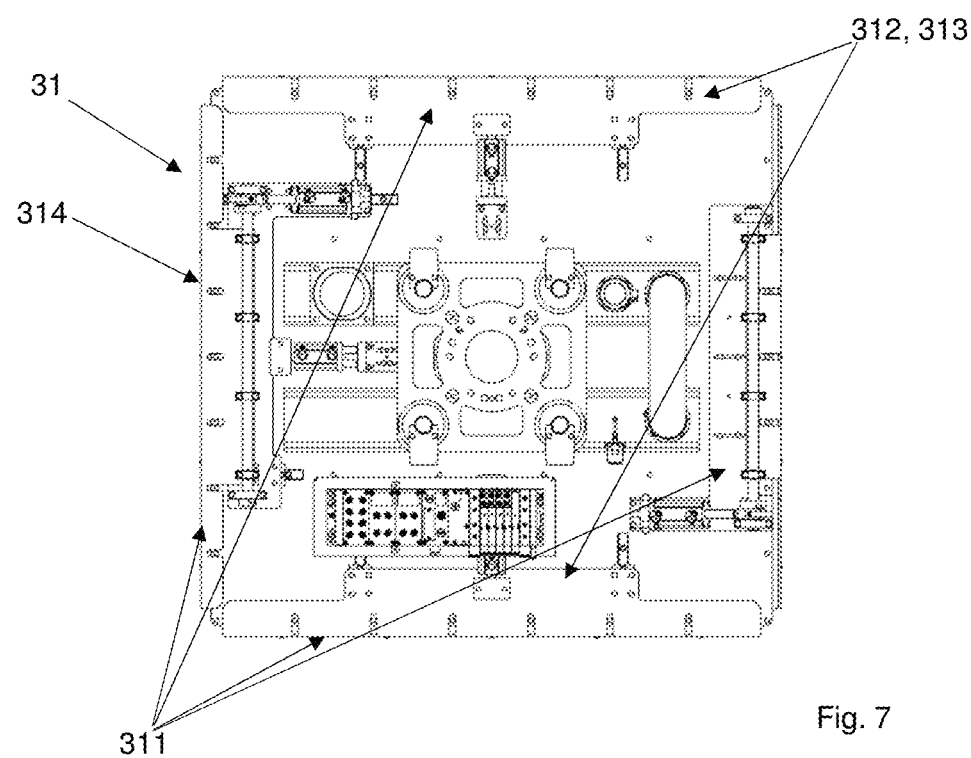
Figure 8:
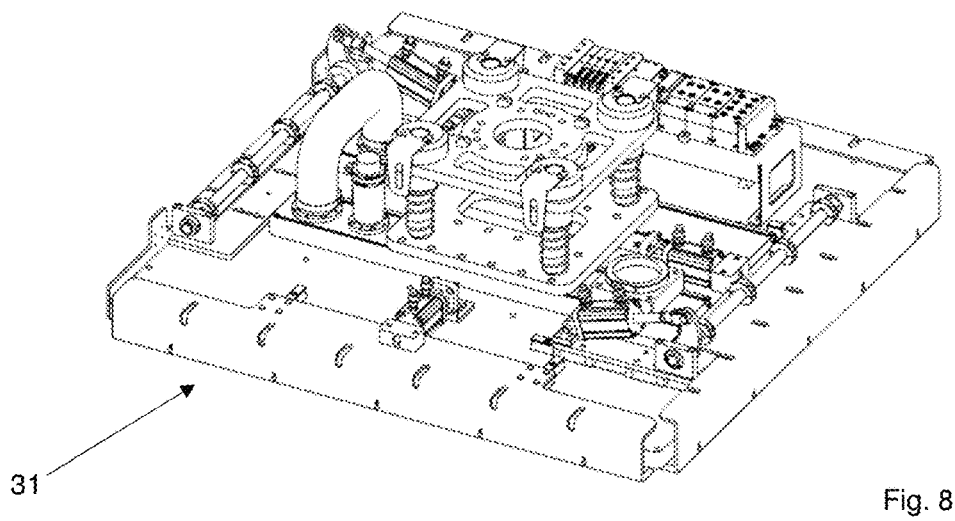
Figure 9:
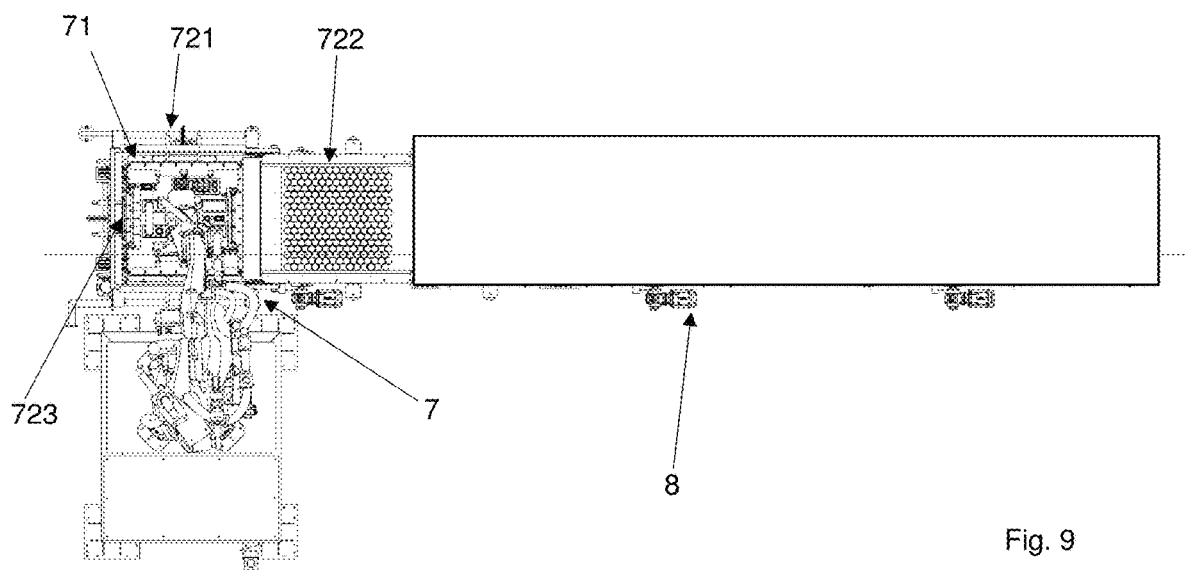
FIG. 9 shows a portion of the apparatus of FIG. 1.
Figure 10:
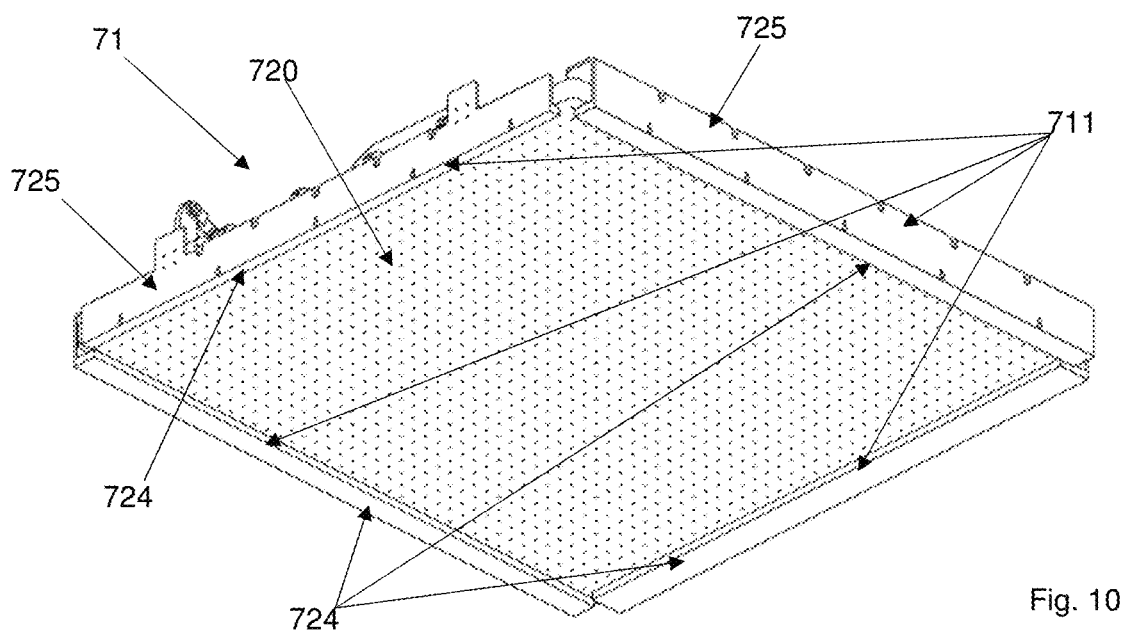
FIG. 10 shows a detail of a component of FIG. 9.

The first pick-up head 31 comprises a belt 315 of material compressible in thickness and permeable to air (the belt is illustrated in schematic, partially interrupted form in FIG. 6). Suitably, the belt 315 covers said one or more suction nozzles 710 of the first head 31. The belt 315 is intended to come into contact with said group of containers.

The belt 315 facilitates the gripping of a plurality of containers placed in the housing area 316.

The apparatus 1 suitably comprises a support 32 in/on which said stacking system 3 positions several overlapping layers of containers.

Said support 32 is a basket 320 which is open above and which comprises a lower bottom 321 and lateral walls 322. Suitably, the basket 320 is metallic.

The apparatus 1 comprises a de-stacking system 7 for de-stacking said overlapping layers of containers.

The de-stacking system 7 comprises a second pick-up head 71. The second pick-up head 71 defines a housing area 720 of the group of containers and the second pick-up head 71 in turn comprising: one or more suction nozzles 710 for sucking one of said overlapping layers and lateral sides 711 which laterally retain said group of containers. Suitably such sides 711 comprise a vertical wall 725 and a lower edge 724 bent towards the inside of the housing area 720. The lower edge is suitably horizontal. Suitably, such sides 711 define a C-shaped cross-section. The de-stacking system 7 is downstream of the stacking system 3. The de-stacking system 7 comprises a gripping station 721 and an unloading station 722 for gripping and unloading said group of containers by means of the second pick-up head 71. The lateral sides 711 of the second pick-up head 71 comprise an additional side 723 which in at least a first operating configuration of the second pick-up head 71 is arranged rearwards with respect to a direction which extends from the gripping station 721 towards the unloading station 722. The first operating configuration is suitably defined as a configuration assumed by the second pick-up head 71 during the movement from the gripping station 721 to the loading station 722 with said group of containers on board.

Suitably the system 60 for treating containers is operatively interposed between the stacking system 3 and the de-stacking system 7.

Advantageously, the apparatus 1 comprises an evacuation line 8 for evacuating the containers unloaded from the de-stacking system 7. For example, such an evacuation line 8 can comprise a conveyor belt or other conveyor.

Suitably the second pick-up head 71 is intended to pick up one of said overlapping layers from the support and position it along the evacuation line 8. The second head 71 can then successively pick up the overlapping layers of the support to position them along the evacuation line 8.

Some embodiments relate to an apparatus 1 for moving containers comprising: a de-stacking system 7 for de-stacking several overlapping layers of containers and a feeding line 70 for feeding said containers to said de-stacking system 7. Suitably the feeding line 70 is located downstream of a system 60 for treating containers, typically a system 6 for sterilising containers.

The de-stacking system 7 comprises a pick-up head 71 for picking up a group of said containers from said feeding line 2.

The pick-up head 71 in turn comprises: one or more suction nozzles 710 for sucking said group of containers and lateral compression sides 711 which laterally retain said group of containers.

Suitably, what was indicated above for the second head 71 can be repeated for the pick-up head 71.

Suitably upstream of the system 60 for treating containers there can be a system 3 for stacking a plurality of layers of containers. Suitably the stacking system 3 comprises a pick-up head 31. Suitably, one or more of the features already previously indicated for the first head 31 can be repeated for the pick-up head 31.

Some embodiments relate to a method for moving containers. Suitably, such a method is implemented by an apparatus 1 for moving containers having one or more of the features described above. Such a method comprises the step of conveying the containers along a feeding line 2 to a first stacking head 31. Suitably this comprises the step of conveying the containers along a conveyor, for example a conveyor belt.

The method comprises the step of picking up a first group of said containers by means of said first stacking head 31. In this regard, the method comprises the step of isolating, along the conveyor, the first group of containers. For example, this can occur by means of a separator bar 20 which prevents the advancement of the containers placed upstream of the first group. A conveyor belt instead allows the advancement of the first group of containers.

The first group of containers is placed on a support 32 by the first head 31. Such a support 32 is suitably a basket 320. Typically, the support 32 (or at least a lower base thereof) is located lower relative to an area from which the first group of containers is picked up by the first head 31.

The step of picking up the first group comprises the sub-steps of: sucking said first group of containers by means of one or more suction nozzles 310 placed on the first stacking head 31 and laterally blocking said first group of containers by means of lateral compression sides 311 placed on the first head 31 which laterally retain the first group of containers.

The method further comprises the step of picking up a second group of said containers by means of said first stacking head 31. The method then includes stacking a second layer defined by the second group above a first layer defined by the first group. What is described for the step of picking up the first group can be repeated for the step of picking up the second group.

Similarly, further groups of containers can be picked up and stacked on top of the first and the second group.

The method further includes moving the aforementioned support 32 and performing a treatment (for example sterilisation) of the containers contained therein.

Suitably, the method comprises the step of de-stacking the first and the second layer. More generally, it includes de-stacking the layers stacked on top of each other. This occurs after the step of performing the treatment described above (for example the aforementioned sterilisation) of said containers. The de-stacking step involves picking up the second layer by means of a de-stacking head 71 (and advantageously positioning it along an evacuation line). The same occurs for the first layer (placed on the support). More in general, it occurs for all the layers stacked on the support 32 (in particular inside the basket).

The step of de-stacking the second layer (but analogous to what can be repeated for the first layer or one of the other stacked layers) comprises the steps of: sucking said second group defining the second layer of containers by means of one or more suction nozzles 710 placed on the de-stacking head 71 and laterally blocking said second group of containers by means of lateral compression sides 711 placed on the de-stacking head 71 and which laterally retain the second group of containers.

The current disclosure may achieves one or more advantages. For example, the current disclosure allows to optimize or helps to improve the transfer of layers of containers, in particular the stacking and/or de-stacking. This helps to achieve a more precise and orderly transfer, minimising the risk that one or more of the containers in the layer are not transferred correctly.

The invention as it is conceived is susceptible to numerous modifications and variants, all falling within the scope of the inventive concept characterised thereby. Further, all the details can be replaced with other technically equivalent elements. In practice, all the materials used, as well as the dimensions, can be any whatsoever, according to need.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the disclosure and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

The invention claimed is:

1. An apparatus for moving containers, the apparatus comprising:
   a stacking system for forming several overlapping layers of containers; and
   a feeding line for feeding said containers to said stacking system, said stacking system comprising:
- a first pick-up head for picking up a group of said containers from said feeding line to form one of said layers, the first pick-up head defining a housing area of the group of containers, said first pick-up head comprising:
    - one or more suction nozzles for sucking said group of containers; and
    - lateral sides which laterally retain said group of containers;
- a gripping station for gripping the group of containers via the first pick-up head;
- an unloading station for unloading said group of containers via the first pick-up head; and
- a support on which said stacking system positions several overlapping layers of containers, the support being located lower relative to an area from which the group of containers is picked up by the first pick-up head,
- wherein said lateral sides of the first pick-up head comprise a thrust side which in at least a first operating configuration of the first pick-up head is arranged rearwards with respect to a direction which extends from the gripping station towards the unloading station, said lateral sides comprising a vertical wall and a lower edge bent towards an inside of the housing area, and
- wherein the first operating configuration is defined as a configuration assumed by the first pick-up head during movement from the gripping station to the unloading station with said group of containers held by the first pick-up head.

2. The apparatus according to claim 1, wherein the lateral sides of the first pick-up head in turn comprise at least two opposite sides.

3. The apparatus according to claim 1, further comprising a station for sterilising the containers placed downstream of said stacking system.

4. The apparatus according to claim 1, wherein said first pick-up head comprises a belt of material compressible in thickness and permeable to air, wherein said belt covering said one or more suction nozzles of the first pick-up head and configured to come into contact with said group of containers.

5. The apparatus according to claim 1, further comprising a de-stacking system for de-stacking said overlapping layers of containers,
said de-stacking system comprising a second pick-up head and said second pick-up head comprising:
- one or more second suction nozzles for sucking one of said overlapping layers; and
- second lateral sides which laterally retain said group of containers,
- wherein said de-stacking system is placed downstream of said stacking system.

6. An apparatus for moving containers, the apparatus comprising:
i) a de-stacking system for de-stacking several overlapping layers of containers; and
ii) a feeding line for feeding said containers to said de-stacking system,
said de-stacking system comprising a first pick-up head for picking up a group of said containers from said feeding line and said first pick-up head defining a housing area of the group of containers;
iii) a gripping station for gripping said group of containers using the first pick-up head; and
iv) an unloading station for unloading said group of containers using the first pick-up head,
said first pick-up head comprises:
- one or more suction nozzles for sucking said group of containers; and
- lateral sides which laterally retain said group of containers, said lateral sides include a thrust side which in at least a first operating configuration of the first head is arranged rearwards with respect to a direction which extends from the gripping station towards the unloading station, the first operating configuration defined as a configuration of the first head when the first head moves from the gripping station to the unloading station with said group of containers on board the first head,
- said lateral sides comprising a vertical wall and a lower edge bent towards an inside of the housing area of the group of containers defined by the first pick-up head, the lower edge configured to contact laterally the containers placed in said housing area.

* * * * *